United States Patent
Ohseki et al.

(10) Patent No.: US 8,737,208 B2
(45) Date of Patent: May 27, 2014

(54) WIRELESS RESOURCE ALLOCATION APPARATUS AND METHOD

(75) Inventors: Takeo Ohseki, Fujimino (JP); Toshihiko Komine, Fujimino (JP); Satoshi Konishi, Fujimino (JP)

(73) Assignee: KDDI Corporation, Tokyo (JP)

( * ) Notice: Subject to any disclaimer, the term of this patent is extended or adjusted under 35 U.S.C. 154(b) by 916 days.

(21) Appl. No.: 12/877,372

(22) Filed: Sep. 8, 2010

(65) Prior Publication Data

US 2011/0063975 A1    Mar. 17, 2011

(30) Foreign Application Priority Data

Sep. 16, 2009    (JP) ................................ 2009-214854

(51) Int. Cl.
*H04B 7/14* (2006.01)
*H04J 1/10* (2006.01)
*H04J 3/08* (2006.01)
*H04W 4/00* (2009.01)

(52) U.S. Cl.
USPC ........................... 370/230; 370/315; 370/329

(58) Field of Classification Search
USPC ......... 370/229–235, 252, 253, 328, 329, 338, 370/341
See application file for complete search history.

(56) References Cited

U.S. PATENT DOCUMENTS

| | | | |
|---|---|---|---|
| 2008/0192674 A1* | 8/2008 | Wang et al. | 370/315 |
| 2008/0225783 A1* | 9/2008 | Wang et al. | 370/329 |
| 2008/0253326 A1* | 10/2008 | Damnjanovic | 370/329 |
| 2008/0310355 A1* | 12/2008 | Cai et al. | 370/329 |
| 2009/0046639 A1* | 2/2009 | Cai et al. | 370/329 |
| 2009/0046650 A1* | 2/2009 | Dalsgaard et al. | 370/329 |
| 2009/0073907 A1* | 3/2009 | Cai | 370/311 |
| 2009/0073958 A1* | 3/2009 | Xu | 370/352 |

(Continued)

FOREIGN PATENT DOCUMENTS

WO    2007/148706 A1    12/2007
WO    2008/096527 A1    8/2008

(Continued)

OTHER PUBLICATIONS

3GPP Ts 36.211, V8.7.0 "Evolved Universal Terrestrial Radio Access (E-UTRA); Physical channels and modulation," pp. 1-5 (Table of Contents), 2009.

(Continued)

*Primary Examiner* — Ian Moore
*Assistant Examiner* — Jenee Alexander
(74) *Attorney, Agent, or Firm* — Morgan, Lewis & Bockius LLP

(57) ABSTRACT

A wireless resource allocation apparatus performs determining an amount of VoIP traffic for each terminal station; determining whether semi-persistent scheduling or dynamic scheduling is used for transmitting each packet of the VoIP traffic, based on a result of the determination for the amount of the VoIP traffic; managing, for each terminal station, a resource block allocated in the semi-persistent scheduling; and managing each resource block which is not managed for the allocation in the semi-persistent scheduling and is allocated in the dynamic scheduling. If it is determined that the dynamic scheduling is used for transmitting each packet of the VoIP traffic to a terminal station, the resource block, which has been managed for the relevant terminal station as a resource block allocated in the semi-persistent scheduling, is released, and the released resource block is managed as a resource block allocated in the dynamic scheduling.

5 Claims, 3 Drawing Sheets

(56) References Cited

U.S. PATENT DOCUMENTS

| | | |
|---|---|---|
| 2009/0080379 A1* | 3/2009 | Takashima .................... 370/329 |
| 2009/0103440 A1* | 4/2009 | Wang et al. .................... 370/237 |
| 2009/0103500 A1* | 4/2009 | Malkamaki et al. .......... 370/336 |
| 2009/0175159 A1* | 7/2009 | Bertrand et al. ............... 370/203 |
| 2009/0175233 A1* | 7/2009 | Ojala et al. .................... 370/329 |
| 2009/0196236 A1* | 8/2009 | Cai et al. ........................ 370/329 |
| 2009/0238120 A1* | 9/2009 | Cai et al. ........................ 370/329 |
| 2009/0238128 A1* | 9/2009 | Park et al. ...................... 370/329 |
| 2009/0245194 A1* | 10/2009 | Damnjanovic et al. ....... 370/329 |
| 2009/0249153 A1* | 10/2009 | Zhang ............................ 714/748 |
| 2009/0274107 A1* | 11/2009 | Park et al. ...................... 370/329 |
| 2010/0113080 A1* | 5/2010 | Ishii et al. ...................... 455/509 |
| 2010/0128687 A1* | 5/2010 | Oteri et al. ..................... 370/329 |
| 2010/0138541 A1* | 6/2010 | Zhu et al. ....................... 709/226 |

FOREIGN PATENT DOCUMENTS

| | | |
|---|---|---|
| WO | 2008/108228 A1 | 9/2008 |
| WO | 2009/001594 A1 | 12/2008 |
| WO | 2009/133954 A1 | 11/2009 |

OTHER PUBLICATIONS

Jiang et al, "Principle and Performance of Semi-persistent Scheduling for VoIP in LTE System", 2007 International Conference on Wireless Communications, Networking and Mobile Computing (WiCom 2007), IEEE, pp. 2861-2864, 2007.

Japanese Office Action dated Mar. 12, 2013 for corresponding international application No. JP2009-214854.

* cited by examiner

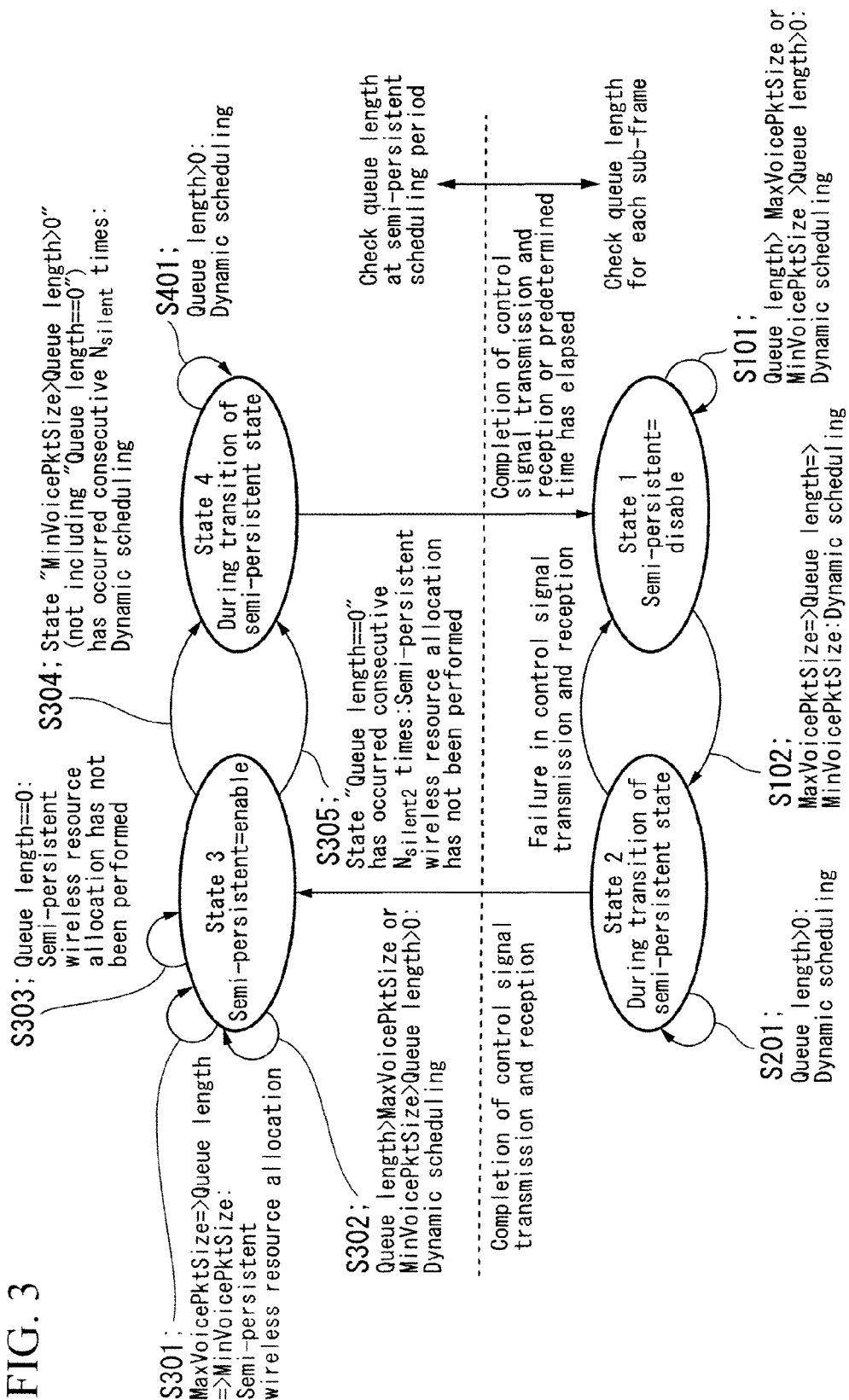

WIRELESS RESOURCE ALLOCATION APPARATUS AND METHOD

BACKGROUND OF THE INVENTION

1. Field of the Invention

The present invention relates to a wireless resource allocation apparatus and a corresponding method.

Priority is claimed on Japanese Patent Application No. 2009-214854, filed Sep. 16, 2009, the contents of which are incorporated herein by reference.

2. Description of the Related Art

In recent years, LTE (long term evolution), one of 3GPP (third generation partnership project) standards, is known as an advanced mobile communication method for implementing high-speed and wide-range wireless transmission (see, for example, Non-Patent Document 1: 3GPP TS 36.211, "Evolved Universal Terrestrial Radio Access (E-UTRA); Physical channels and modulation").

In the LTE standard, an OFDMA (orthogonal frequency division multiple access) method is used as a wireless transmission method for downstream links (i.e., links from a base station to terminal stations). The OFDMA method is a multi-carrier transmission method which performs communication using a wide-band signal which is formed by sub-carriers whose frequencies are orthogonal to each other. In this method, each user (terminal station or terminal unit) uses an individual sub-carrier, so that a multi-access connection between a single base station and a plurality of users can be realized.

Also in the LTE standard, a mechanism called "semi-persistent scheduling" for efficiently transmitting a VoIP (voice over Internet protocol) traffic is defined in a standard specification. The semi-persistent scheduling effectively uses characteristics of packets in a VoIP traffic which arrive regularly, and the scheduling is performed by the following procedure.

(1) A base station informs each terminal station in advance of setting information such as packet transmission period based on a semi-persistent scheduling (i.e., "semi-persistent scheduling packet transmission period") by means of an RRC (radio resource control) layer signaling.

(2) The base station informs each terminal station of a sub-frame and a resource block (RB) which are first used in the semi-persistent scheduling by means of a control signal through a physical layer (PHY layer).

(3) After that, the base station sends no control signal through the physical layer, and sends each packet of the VoIP traffic to each terminal station, by using the transmission period, the sub-frame, and the resource block in the relevant sub-frame, which have been designated in the above steps (1) and (2).

The advantage of the above procedure is to have the above step (3) in which the base station does not need to send the control signal through the physical layer, so that no control channel in the physical layer is subjected to pressure and many VoIP traffics can be contained in the control channel.

As described above, in the semi-persistent scheduling defined in LTE, the semi-persistent scheduling packet transmission period, and the sub-frame and resource block for transmission are determined in advance, and each terminal station receives packets of a VoIP traffic sent from the base station. Here, for the usage of the relevant wireless resource, there is a tacit agreement between the base station and each terminal station.

However, in actual VoIP traffics, especially in downstream links, each packet may not arrive at a scheduled time, due to, for example, congestion in an upper-layer network. Additionally, in a VoIP traffic (e.g., AMR (adaptive multiple-rate)) which employs a variable bandwidth codec, the actual operation may differ from an assumption defined when reserving a wireless resource based on the semi-persistent scheduling. For example, packets of a VoIP traffic having a size out of the relevant assumption may arrive. In such a case, it is impossible to perform efficient wireless resource allocation.

SUMMARY OF THE INVENTION

In light of the above circumstances, an object of the present invention is to provide a wireless resource allocation apparatus and a corresponding method for more efficiently performing wireless resource allocation.

Therefore, the present invention provides a wireless resource allocation apparatus comprising:

a traffic determination unit that determines an amount of VoIP traffic for each terminal station;

a scheduling operation state manager that determines whether semi-persistent scheduling or dynamic scheduling is used for transmitting each packet of the VoIP traffic, based on a result of the determination for the amount of the VoIP traffic;

a semi-persistent scheduling using RB manager that manages, for each terminal station, a resource block allocated in the semi-persistent scheduling; and a dynamic scheduling using RB manager that manages each resource block which is not managed by the semi-persistent scheduling using RB manager and is allocated in the dynamic scheduling, wherein if the scheduling operation state manager has determined that the dynamic scheduling is used for transmitting each packet of the VoIP traffic to a terminal station, the semi-persistent scheduling using RB manager releases the resource block managed for the relevant terminal station, and the dynamic scheduling using RB manager manages the released resource block as a resource block allocated in the dynamic scheduling.

In a typical example:

the traffic determination unit determines, for each terminal station, whether or not the amount of VoIP traffic is larger than the size of the resource block managed by the semi-persistent scheduling using RB manager;

if it is determined that the amount of VoIP traffic is larger than the size of the resource block managed by the semi-persistent scheduling using RB manager, the scheduling operation state manager determines that the dynamic scheduling is used for transmitting each packet of the VoIP traffic; and if it is determined that the amount of VoIP traffic is smaller than or equal to the size of the resource block managed by the semi-persistent scheduling using RB manager, the scheduling operation state manager determines that the semi-persistent scheduling is used for transmitting each packet of the VoIP traffic.

In another typical example:

the traffic determination unit determines, for each terminal station, whether or not the amount of VoIP traffic is smaller than a threshold which is smaller than or equal to the size of the resource block managed by the semi-persistent scheduling using RB manager;

if it is determined that the amount of VoIP traffic is smaller than the threshold, the scheduling operation state manager determines that the dynamic scheduling is used for transmitting each packet of the VoIP traffic; and if it is determined that the amount of VoIP traffic is larger than or equal to the threshold, the scheduling operation state manager determines that the semi-persistent scheduling is used for transmitting each packet of the VoIP traffic In another typical example:

the traffic determination unit determines, for each terminal station, whether or not the amount of VoIP traffic is smaller than or equal to the size of the resource block managed by the semi-persistent scheduling using RB manager, and also is larger than or equal to a threshold which is smaller than or equal to the size of the resource block managed by the semi-persistent scheduling using RB manager; and if it is determined that the amount of VoIP traffic is smaller than or equal to the size of the resource block managed by the semi-persistent scheduling using RB manager, and also is larger than or equal to the threshold, the scheduling operation state manager determines that the semi-persistent scheduling is used for transmitting each packet of the VoIP traffic, otherwise the scheduling operation state manager determines that the dynamic scheduling is used for transmitting each packet of the VoIP traffic.

The present invention also provides a wireless resource allocation method comprising:

a traffic determination step that determines an amount of VoIP traffic for each terminal station;

a scheduling operation state managing step that determines whether semi-persistent scheduling or dynamic scheduling is used for transmitting each packet of the VoIP traffic, based on a result of the determination for the amount of the VoIP traffic;

a semi-persistent scheduling using RB managing step that manages, for each terminal station, a resource block allocated in the semi-persistent scheduling; and a dynamic scheduling using RB managing step that manages each resource block which is not managed by the semi-persistent scheduling using RB managing step and is allocated in the dynamic scheduling, wherein if the scheduling operation state managing step has determined that the dynamic scheduling is used for transmitting each packet of the VoIP traffic to a terminal station, the semi-persistent scheduling using RB managing step releases the resource block managed for the relevant terminal station, and the dynamic scheduling using RB managing step manages the released resource block as a resource block allocated in the dynamic scheduling.

In accordance with the present invention, it is possible to more efficiently perform the wireless resource allocation.

BRIEF DESCRIPTION OF THE DRAWINGS

FIG. 3 is a schematic diagram showing the transition of the scheduling operating state of the wireless resource allocation apparatus in the embodiment.

DETAILED DESCRIPTION OF THE INVENTION

Hereinafter, an embodiment of the present invention will be described with reference to the appended figures.

Figure 1:
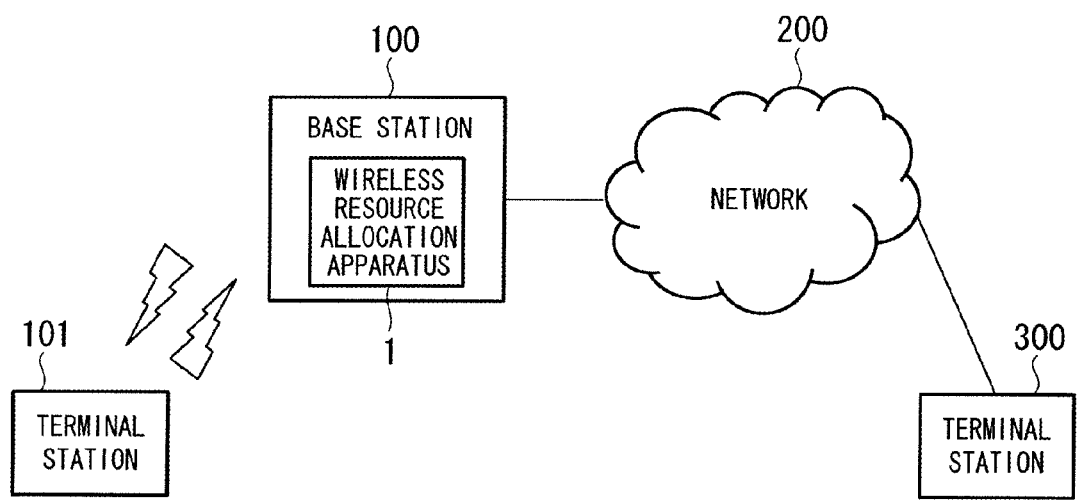
FIG. 1 is a diagram showing the general structure of a network, which includes a base station having a wireless resource allocation apparatus as an embodiment of the present invention, and terminal stations which perform voice communication by means of VoIP.

FIG. 1 is a diagram showing the general structure of a network, which includes (i) a base station having a wireless resource allocation apparatus of the present embodiment and (ii) terminal stations which perform voice communication by means of VoIP.

A base station 100 and a terminal station 101 are connected via a wireless network, so that data can be transmitted and received between them. The base station 100 and the terminal station 101 use a communication standard called LTE (long term evolution).

The base station 100 is connected to a network 200, and can communicate with a terminal station 300 via the network 200.

The base station 100 receives data from the terminal station 300, and sends the received data to the terminal station 101. The base station 100 also receives data from the terminal station 101, and sends the received data to the terminal station 300.

The terminal stations 101 and 300 perform voice communication by means of VoIP. In the voice communication, a wireless resource allocation apparatus 1 in the base station 100 performs wireless resource allocation for sending packets of a VoIP traffic, so as to efficiently transmit each VoIP traffic packet (i.e., each packet of the VoIP traffic), which is sent from the terminal station 300, to the terminal station 101.

In the semi-persistent scheduling defined in LTE, (i) the transmission period of each packet scheduled by the semi-persistent scheduling (i.e., each VoIP traffic packet), (ii) the sub-frame for the relevant transmission, and (iii) the resource block (RB) to which each VoIP traffic packet is allocated, are determined in advance (from the base station 100 to the terminal station 101).

Figure 2:
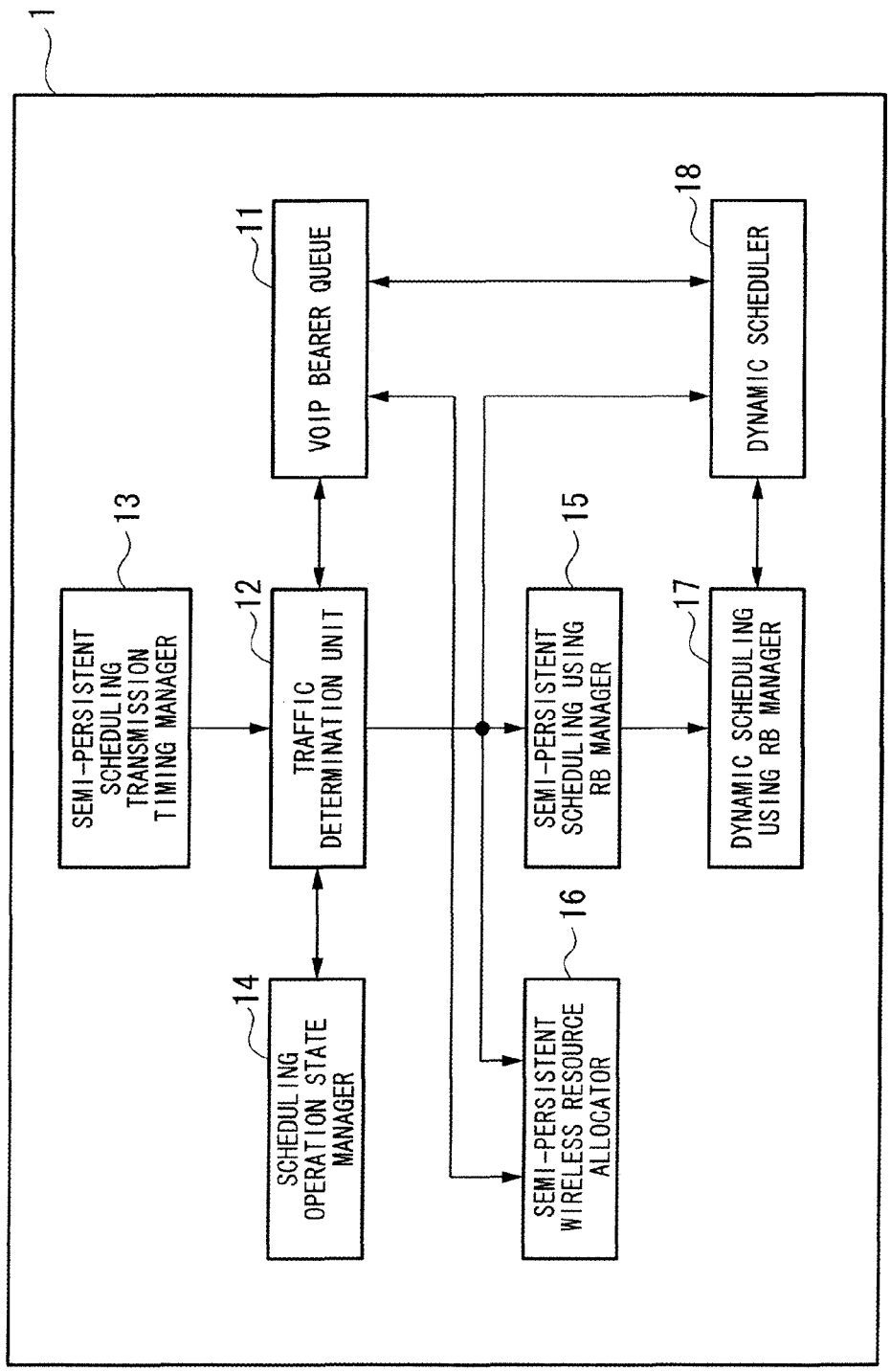
FIG. 2 is a diagram showing the structure of the wireless resource allocation apparatus of the embodiment.

FIG. 2 is a diagram showing the structure of the wireless resource allocation apparatus 1 of the present embodiment. In the shown example, the wireless resource allocation apparatus 1 includes a VoIP bearer queue 11, a traffic determination unit 12, a semi-persistent scheduling transmission timing manager 13, a scheduling operation state manager 14, a semi-persistent scheduling using RB manager 15, a semi-persistent wireless resource allocator 16, a dynamic scheduling using RB manager 17, and a dynamic scheduler 18.

The VoIP bearer queue 11 holds packets of a VoIP traffic (called a "VoIP bearer in the 3GPP standard") for each terminal station 101 as a destination. More specifically, the VoIP bearer queue 11 holds packets of a VoIP traffic sent from the terminal station 300, for each terminal station 101.

The traffic determination unit 12 determines the amount of packets (i.e., the queue length) held by the VoIP bearer queue 11, for each terminal station 101 as a destination.

The semi-persistent scheduling transmission timing manager 13 manages the packet transmission timing from the base station 100 to each terminal station 101, by means of the semi-persistent scheduling.

Based on the results of determination by the traffic determination unit 12 for the amount of packets held by the VoIP bearer queue 11, the scheduling operation state manager 14 manages a scheduling operating state by which the operating state of the wireless resource allocation apparatus 1 is defined. The scheduling operating state will be explained later.

The semi-persistent scheduling using RB manager 15 manages each resource block used when the base station 100 sends VoIP traffic packets to each terminal station 101 by means of the semi-persistent scheduling.

Based on the determination of the traffic determination unit 12 and the information managed by the semi-persistent scheduling using RB manager 15, the semi-persistent wireless resource allocator 16 allocates each VoIP traffic packet (sent from the base station 100 to each terminal station 101 by means of the semi-persistent scheduling) to a resource block.

The dynamic scheduling using RB manager 17 manages each resource block which can be used when the base station 100 sends VoIP traffic packets or packets of another traffic to each terminal station 101 by means of dynamic scheduling (dynamic wireless resource allocation for each sub-frame)

Based on the determination of the traffic determination unit 12 and the information managed by the dynamic scheduling using RB manager 17, the dynamic scheduler 18 allocates each traffic packet of a VoIP traffic or the like (sent from the base station 100 to each terminal station 101 by means of the dynamic scheduling) to a resource block.

Below, wireless resource allocation to the base station 100 will be explained, where the wireless resource allocation apparatus 1 performs the relevant process for each terminal station 101 so that the base station 100 sends VoIP traffic packets to each terminal station 101.

In the present embodiment, when the packet size of the VoIP traffic is larger than a resource block size (MaxVoicePktSize) defined in the semi-persistent scheduling, the base station 100 sends VoIP traffic packets by using the dynamic scheduling. When the packet size of the VoIP traffic is smaller than the resource block size defined in the semi-persistent scheduling (which causes a waste of the capacity of the relevant resource block) and also smaller than a size (MinVoicePktSize) by which it can be determined that the waste of the capacity of the resource block is relatively large, the base station 100 sends VoIP traffic packets by using the dynamic scheduling.

The above (threshold) values MaxVoicePktSize and MinVoicePktSize can be set to any values.

FIG. 3 is a schematic diagram showing the transition of the scheduling operating state of the wireless resource allocation apparatus 1 for the wireless resource allocation so that the base station 100 sends VoIP traffic packets to each terminal station 101.

The operation of the wireless resource allocation apparatus 1 depends on the scheduling operating state. In the present embodiment, the scheduling operating state of the wireless resource allocation apparatus 1 is classified into 4 states, such as State 1 to State 4. The scheduling operating state of the wireless resource allocation apparatus 1 is managed by the semi-persistent scheduling transmission timing manager 13. The scheduling operating state when the base station 100 starts VoIP traffic packet transmission to each terminal station 101 is State 1.

When the scheduling operating state of the wireless resource allocation apparatus 1 is State 1, the wireless resource allocation apparatus 1 performs wireless resource allocation by means of the dynamic scheduling.

When the scheduling operating state of the wireless resource allocation apparatus 1 is State 3, the wireless resource allocation apparatus 1 performs wireless resource allocation by means of the semi-persistent scheduling. However, even when the scheduling operating state of the wireless resource allocation apparatus 1 is State 3, the wireless resource allocation apparatus 1 may perform wireless resource allocation by means of the dynamic scheduling.

The transition state from State 1 to State 3 is defined as State 2. In addition, the transition state from State 3 to State 1 is defined as State 4.

Operation of the Wireless Resource Allocation Apparatus 1 in State 1

Below, the operation of the wireless resource allocation apparatus 1 when the scheduling operating state is State 1 will be explained.

When the scheduling operating state managed by the scheduling operation state manager 14 is State 1, the traffic determination unit 12 measures the queue length of the VoIP bearer queue 11 every time the sub-frame transmission starts.

When the measured queue length of the VoIP bearer queue 11 is larger than the above MaxVoicePktSize, or smaller than the above MinVoicePktSize but larger than zero, the traffic determination unit 12 executes process S101. When the measured queue length of the VoIP bearer queue 11 is smaller than or equal to MaxVoicePktSize and also is larger than or equal to MinVoicePktSize, the traffic determination unit 12 executes process S102.

Process S101: The traffic determination unit 12 commands the dynamic scheduler 18 to perform wireless resource allocation so that the base station 100 sends VoIP traffic packets to each terminal station 101 by means of the dynamic scheduling.

The commanded dynamic scheduler 18 allocates each VoIP traffic packet (sent from the base station 100 to the terminal station 101) to a resource block which is managed by the dynamic scheduling using RB manager 17 and can be used in the dynamic scheduling. The base station 100 then stores the VoIP traffic packets to the allocated resource block, and sends the relevant sub-frame to the terminal station 101. After that, the wireless resource allocation apparatus 1 repeats the operation of State 1.

Process S102: The traffic determination unit 12 commands the dynamic scheduler 18 to perform wireless resource allocation so that the base station 100 sends VoIP traffic packets to each terminal station 101 by means of the dynamic scheduling.

The commanded dynamic scheduler 18 allocates each VoIP traffic packet (sent from the base station 100 to the terminal station 101) to a resource block which is managed by the dynamic scheduling using RB manager 17 and can be used in the dynamic scheduling. The base station 100 then stores the VoIP traffic packets to the allocated resource block, and sends the relevant sub-frame to the terminal station 101.

After that, since the queue length of the VoIP bearer queue 11 is smaller than or equal to MaxVoicePktSize and also is larger than or equal to MinVoicePktSize, the scheduling operation state manager 14 changes the scheduling operating state (stored by the manager 14) of the wireless resource allocation apparatus 1 to State 2. In this process, the base station 100 sends information to the terminal station 101 by using a control signal through a physical layer, where the information indicates the VoIP traffic packet transmission by means of the semi-persistent scheduling.

After that, the wireless resource allocation apparatus 1 performs the operation of State 2.

Operation of the Wireless Resource Allocation Apparatus 1 in State 2

Below, the operation of the wireless resource allocation apparatus 1 when the scheduling operating state is State 2 will be explained.

When the scheduling operating state managed by the scheduling operation state manager 14 is State 2, the traffic determination unit 12 measures the queue length of the VoIP bearer queue 11 every time the sub-frame transmission starts.

When the measured queue length of the VoIP bearer queue 11 is larger than zero, the traffic determination unit 12 executes process S201.

Process S201: The traffic determination unit 12 commands the dynamic scheduler 18 to perform wireless resource allocation so that the base station 100 sends VoIP traffic packets to each terminal station 101 by means of the dynamic scheduling.

The commanded dynamic scheduler 18 allocates each VoIP traffic packet (sent from the base station 100 to the terminal station 101) to a resource block which is managed by the dynamic scheduling using RB manager 17 and can be used in the dynamic scheduling. The base station 100 then stores the VoIP traffic packets to the allocated resource block, and sends the relevant sub-frame to the terminal station 101.

Apart from the queue length measurement of the VoIP bearer queue 11 by the traffic determination unit 12, the scheduling operation state manager 14 determines whether or not the information that the VoIP traffic packets are sent by the semi-persistent scheduling has been communicated to the relevant terminal station 101, so as to determine whether the state is changed to State 3 or State 1.

More specifically, the scheduling operation state manager 14 determines whether or not the base station 100 has received a response message from the terminal station 101, where the response message is a response to the control signal through the physical layer, which includes the information that indicates the VoIP traffic packet transmission by using the semi-persistent scheduling.

When it is determined that the base station 100 has received the response message from the terminal station 101, the scheduling operation state manager 14 changes the scheduling operating state (stored by the manager 14) of the wireless resource allocation apparatus 1 to State 3. After that, the wireless resource allocation apparatus 1 performs the operation assigned to State 3.

When it is determined that the base station 100 has not received the response message from the terminal station 101, the scheduling operation state manager 14 changes the scheduling operating state of the wireless resource allocation apparatus 1 to State 1. After that, the wireless resource allocation apparatus 1 performs the operation assigned to State 1.

Operation of the Wireless Resource Allocation Apparatus 1 in State 3

Below, the operation of the wireless resource allocation apparatus 1 when the scheduling operating state is State 3 will be explained.

When the scheduling operating state managed by the scheduling operation state manager 14 is State 3, the traffic determination unit 12 measures the queue length of the VoIP bearer queue 11 regularly by the semi-persistent scheduling packet transmission period managed by the semi-persistent scheduling transmission timing manager 13.

When the measured queue length of the VoIP bearer queue 11 is smaller than or equal to MaxVoicePktSize and also is larger than or equal to MinVoicePktSize, the traffic determination unit 12 executes process S301. When the measured queue length of the VoIP bearer queue 11 is larger than MaxVoicePktSize, or smaller than MinVoicePktSize but larger than zero, the traffic determination unit 12 executes process S302. When the measured queue length of the VoIP bearer queue 11 is zero, the traffic determination unit 12 executes process S303. When a result that the measured queue length of the VoIP bearer queue 11 is smaller than MinVoicePktSize but larger than zero has been obtained consecutive $N_{silent}$ times, the traffic determination unit 12 executes process S304. When a result that the measured queue length of the VoIP bearer queue 11 is zero has been obtained consecutive $N_{silent2}$ times, the traffic determination unit 12 executes process S305.

The above values $N_{silent}$ and $N_{silent2}$ are set to any values so that the transition from State 3 to State 4 does not occur frequently.

Process S301: The traffic determination unit 12 commands the semi-persistent wireless resource allocator 16 to perform wireless resource allocation so that the base station 100 sends VoIP traffic packets to each terminal station 101 by means of the semi-persistent scheduling.

The commanded semi-persistent wireless resource allocator 16 allocates each VoIP traffic packet (sent from the base station 100 to the terminal station 101) to a resource block which is managed by the semi-persistent scheduling using RB manager 15 and is defined in the semi-persistent scheduling. The base station 100 then stores the VoIP traffic packets to the allocated resource block, and sends the relevant sub-frame to the terminal station 101. After that, the wireless resource allocation apparatus 1 repeats the operation of State 3.

Process S302: The traffic determination unit 12 commands the dynamic scheduler 18 to perform wireless resource allocation so that the base station 100 sends VoIP traffic packets to each terminal station 101 by means of the dynamic scheduling.

The commanded dynamic scheduler 18 allocates each VoIP traffic packet (sent from the base station 100 to the terminal station 101) to a resource block which is managed by the dynamic scheduling using RB manager 17 and can be used in the dynamic scheduling.

The traffic determination unit 12 also commands the semi-persistent scheduling using RB manager 15 to temporarily release the resource block defined by the semi-persistent scheduling. The commanded semi-persistent scheduling using RB manager 15 temporarily releases the resource block defined by the semi-persistent scheduling, and informs the dynamic scheduling using RB manager 17 of the temporary release of the resource block defined by the semi-persistent scheduling. Therefore, the dynamic scheduling using RB manager 17 can use the released resource block in the dynamic scheduling. Accordingly, it is possible to release a resource block which is not used in the VoIP traffic packet transmission, thereby efficiently using the wireless resource.

The base station 100 then stores the VoIP traffic packets to the allocated resource block, and sends the relevant sub-frame to the terminal station 101. After that, the wireless resource allocation apparatus 1 repeats the operation of State 3.

Process S303: The traffic determination unit 12 commands the semi-persistent scheduling using RB manager 15 not to release the resource block defined in the semi-persistent scheduling. The commanded semi-persistent scheduling using RB manager 15 does not release the resource block defined in the semi-persistent scheduling. In case of using the semi-persistent scheduling, the terminal station 101 (i.e., receiving side) recognizes that each packet stored in the resource block defined by the semi-persistent scheduling is always a VoIP traffic packet. Therefore, the above non-release of the resource block is performed so that the packet stored in the resource block defined by the semi-persistent scheduling is not used in packet transmission of another traffic. The wireless resource allocation apparatus 1 then repeats the operation of State 3.

Process S304: The traffic determination unit 12 commands the dynamic scheduler 18 to perform wireless resource allocation so that the base station 100 sends VoIP traffic packets to each terminal station 101 by means of the dynamic scheduling.

The commanded dynamic scheduler 18 allocates each VoIP traffic packet (sent from the base station 100 to the terminal station 101) to a resource block which is managed by the dynamic scheduling using RB manager 17 and can be used in the dynamic scheduling. The base station 100 then stores the VoIP traffic packets to the allocated resource block, and sends the relevant sub-frame to the terminal station 101.

Since the result that the measured queue length of the VoIP bearer queue 11 is smaller than MinVoicePktSize but larger than zero has been obtained consecutive $N_{silent}$ times, the scheduling operation state manager 14 changes the scheduling operating state (stored by the manager 14) of the wireless resource allocation apparatus 1 to State 4. In this process, the base station 100 sends information to the terminal station 101 by using a control signal through a physical layer, where the information indicates the VoIP traffic packet transmission by means of the dynamic scheduling. After that, the wireless resource allocation apparatus 1 performs the operation assigned to State 4.

Process S305: The traffic determination unit 12 commands the semi-persistent scheduling using RB manager 15 not to release the resource block defined in the semi-persistent scheduling. The commanded semi-persistent scheduling using RB manager 15 does not release the resource block defined in the semi-persistent scheduling. As described above, in case of using the semi-persistent scheduling, the terminal station 101 (i.e., receiving side) recognizes that each packet stored in the resource block defined by the semi-persistent scheduling is always a VoIP traffic packet. Therefore, the above non-release of the resource block is performed so that the packet stored in the resource block defined by the semi-persistent scheduling is not used in packet transmission of any other traffic.

Since the result that the measured queue length of the VoIP bearer queue 11 is zero has been obtained consecutive $N_{silent2}$ times, the scheduling operation state manager 14 changes the scheduling operating state (stored by the manager 14) of the wireless resource allocation apparatus 1 to State 4. In this process, the base station 100 sends information to the terminal station 101 by using a control signal through a physical layer, where the information indicates the VoIP traffic packet transmission by means of the dynamic scheduling. After that, the wireless resource allocation apparatus 1 performs the operation assigned to State 4.

Operation of the Wireless Resource Allocation Apparatus 1 in State 4

Below, the operation of the wireless resource allocation apparatus 1 when the scheduling operating state is State 4 will be explained.

When the scheduling operating state managed by the scheduling operation state manager 14 is State 4, the traffic determination unit 12 measures the queue length of the VoIP bearer queue 11 regularly by the semi-persistent scheduling packet transmission period managed by the semi-persistent scheduling transmission timing manager 13.

When the measured queue length of the VoIP bearer queue 11 is larger than zero, the traffic determination unit 12 executes process S401.

Process S401: The traffic determination unit 12 commands the dynamic scheduler 18 to perform wireless resource allocation so that the base station 100 sends VoIP traffic packets to each terminal station 101 by means of the dynamic scheduling.

The commanded dynamic scheduler 18 allocates each VoIP traffic packet (sent from the base station 100 to the terminal station 101) to a resource block which is managed by the dynamic scheduling using RB manager 17 and can be used in the dynamic scheduling. The base station 100 then stores the VoIP traffic packets to the allocated resource block, and sends the relevant sub-frame to the terminal station 101.

Apart from the queue length measurement of the VoIP bearer queue 11 by the traffic determination unit 12, the scheduling operation state manager 14 determines whether or not the information that the VoIP traffic packets are sent by the dynamic scheduling has been communicated to the relevant terminal station 101, or whether or not a predetermined time has elapsed after a signal for communication the information (that the VoIP traffic packets are sent by the dynamic scheduling) is sent, so as to determine whether or not the state is changed to State 1.

More specifically, the scheduling operation state manager 14 determines whether or not the base station 100 has received a response message from the terminal station 101, where the response message is a response to the control signal through the physical layer, which includes the information that indicates the VoIP traffic packet transmission by using the dynamic scheduling.

When it is determined that the base station 100 has received the response message from the terminal station 101, the scheduling operation state manager 14 changes the scheduling operating state (stored by the manager 14) of the wireless resource allocation apparatus 1 to State 1.

The scheduling operation state manager 14 also determines whether or not a predetermined time has elapsed after a control signal through the physical layer, which includes the information that the base station 100 sends VoIP traffic packets by the dynamic scheduling, is sent.

When it is determined that the predetermined time has elapsed after the relevant control signal is sent, the scheduling operation state manager 14 changes the scheduling operating state (stored by the manager 14) of the wireless resource allocation apparatus 1 to State 1. After that, the wireless resource allocation apparatus 1 performs the operation assigned to State 1.

When it is determined that the base station 100 has not received the response message from the terminal station 101, the scheduling operation state manager 14 changes the scheduling operating state of the wireless resource allocation apparatus 1 to State 1. After that, the wireless resource allocation apparatus 1 performs the operation assigned to State 1.

As described above, the wireless resource allocation apparatus 1 of the present embodiment compares the size of the resource block defined by the semi-persistent scheduling with the queue length of the VoIP bearer queue 11. If the amount of VoIP traffic packets stored in the VoIP bearer queue 11 is large and cannot be stored in the resource block defined by the semi-persistent scheduling, then the wireless resource allocation apparatus 1 allocates a resource block (i.e., wireless resource) to VoIP traffic packets sent from the base station 100 to the terminal station 101 by means of the dynamic scheduling.

Conventionally, when using the semi-persistent scheduling, the size of the resource block is determined in conformity with the maximum packet size among the VoIP traffic packets sent from the base station 100 to the terminal station 101, because the resource block size cannot be changed. For example, if the VoIP traffic packets sent from the base station 100 to the terminal station 101 includes a packet whose size is larger than the other packets (which is a rare case), then the resource block size should be determined in conformity with the maximum size of the packet sent from the base station 100 to the terminal station 101. Therefore, when sending packets having smaller size, the resource block has an empty space, and thus the relevant wireless resource is wasted.

However, when using the wireless resource allocation apparatus 1 of the present embodiment is used so as to send a VoIP traffic packet whose size is larger than the resource block defined by the semi-persistent scheduling (i.e., larger than MaxVoicePktSize), the packet transmission using the dynamic scheduling can be executed.

Therefore, even in the wireless resource allocation using the semi-persistent scheduling, the size of the resource block defined by the semi-persistent scheduling may not be set to the maximum value of the VoIP traffic packets, and can be set in conformity with an average VoIP traffic packet. Therefore, the empty space in the resource block defined by the semi-persistent scheduling can be reduced, thereby efficiently sending the VoIP traffic packets.

In addition, as described above, the wireless resource allocation apparatus 1 of the present embodiment compares the size of the resource block defined by the semi-persistent scheduling with the queue length of the VoIP bearer queue 11. If the amount of VoIP traffic packets stored in the VoIP bearer queue 11 is small and the size of the resource block defined by the semi-persistent scheduling is large, then the wireless resource allocation apparatus 1 allocates a resource block to VoIP traffic packets sent from the base station 100 to the terminal station 101 by means of the dynamic scheduling.

For example, if there is a VoIP traffic packet (sent from the base station 100 to the terminal station 101) whose size is smaller than the resource block defined by the semi-persistent scheduling, then the resource block has an empty space so as to send such a small packet, and the relevant wireless resource is wasted.

However, when using the wireless resource allocation apparatus 1 of the present embodiment is used so as to send a VoIP traffic packet whose size is smaller than the resource block defined by the semi-persistent scheduling (i.e., smaller than MinVoicePktSize), the packet transmission using the dynamic scheduling can be executed. Therefore, even in the transmission of such a small VoIP traffic packet, the resource block has no empty space, and the VoIP traffic packet can be sent efficiently.

While preferred embodiments of the present invention have been described and illustrated above, it should be understood that these are exemplary embodiments of the invention and are not to be considered as limiting. Additions, omissions, substitutions, and other modifications can be made without departing from the scope of the present invention. Accordingly, the invention is not to be considered as being limited by the foregoing description, and is only limited by the scope of the appended claims.

What is claimed is:

1. A wireless resource allocation apparatus comprising:
a traffic determination unit that determines an amount of VoIP traffic for each terminal station;
a scheduling operation state manager that determines whether semi-persistent scheduling or dynamic scheduling is used for transmitting each packet of the VoIP traffic, based on a result of the determination for the amount of the VoIP traffic;
a semi-persistent scheduling using RB manager that manages, for each terminal station, a resource block allocated in the semi-persistent scheduling; and
a dynamic scheduling using RB manager that manages each resource block which is not managed by the semi-persistent scheduling using RB manager and is allocated in the dynamic scheduling, wherein
if the scheduling operation state manager has determined that the dynamic scheduling is used for transmitting each packet of the VoIP traffic to a terminal station, the semi-persistent scheduling using RB manager releases the resource block managed for the terminal station, and the dynamic scheduling using RB manager manages the released resource block as a resource block allocated in the dynamic scheduling.

2. The wireless resource allocation apparatus in accordance with claim 1, wherein:
the traffic determination unit determines, for each terminal station, whether or amount of VoIP traffic is larger than the size of the resource block managed by the semi-persistent scheduling using RB manager;
if it is determined that the amount of VoIP traffic is larger than a size of the resource block managed by the semi-persistent scheduling using RB manager, the scheduling operation state manager determines that the dynamic scheduling is used for transmitting each packet of the VoIP traffic; and
if it is determined that the amount of VoIP traffic is smaller than or equal to the size of the resource block managed by the semi-persistent scheduling using RB manager, the scheduling operation state manager determines that the semi-persistent scheduling is used for transmitting each packet of the VoIP traffic.

3. The wireless resource allocation apparatus in accordance with claim 1, wherein:
the traffic determination unit determines, for each terminal station, whether or not the amount of VoIP traffic is smaller than a threshold which is smaller than or equal to a size of the resource block managed by the semi-persistent scheduling using RB manager;
if it is determined that the amount of VoIP traffic is smaller than the threshold, the scheduling operation state manager determines that the dynamic scheduling is used for transmitting each packet of the VoIP traffic; and
if it is determined that the amount of VoIP traffic is larger than or equal to the threshold, the scheduling operation state manager determines that the semi-persistent scheduling is used for transmitting each packet of the VoIP traffic.

4. The wireless resource allocation apparatus in accordance with claim 1, wherein:
the traffic determination unit determines, for each terminal station, whether or not the amount of VoIP traffic is smaller than or equal to a size of the resource block managed by the semi-persistent scheduling using RB manager, and also is larger than or equal to a threshold which is smaller than or equal to the size of the resource block managed by the semi-persistent scheduling using RB manager; and
if it is determined that the amount of VoIP traffic is smaller than or equal to the size of the resource block managed by the semi-persistent scheduling using RB manager, and also is larger than or equal to the threshold, the scheduling operation state manager determines that the semi-persistent scheduling is used for transmitting each packet of the VoIP traffic, otherwise the scheduling operation state manager determines that the dynamic scheduling is used for transmitting each packet of the VoIP traffic.

5. A wireless resource allocation method comprising:
a traffic determination step that determines an amount of VoIP traffic for each terminal station;
a scheduling operation state managing step that determines whether semi-persistent scheduling or dynamic scheduling is used for transmitting each packet of the VoIP traffic, based on a result of the determination for the amount of the VoIP traffic;
a semi-persistent scheduling using RB managing step that manages, for each terminal station, a resource block allocated in the semi-persistent scheduling; and
a dynamic scheduling using RB managing step that manages each resource block which is not managed by the semi-persistent scheduling using RB managing step and is allocated in the dynamic scheduling, wherein
if the scheduling operation state managing step has determined that the dynamic scheduling is used for transmitting each packet of the VoIP traffic to a terminal station, the semi-persistent scheduling using RB managing step releases the resource block managed for the terminal station, and the dynamic scheduling using RB managing step manages the released resource block as a resource block allocated in the dynamic scheduling.

* * * * *